(12) United States Patent
Kim et al.

(10) Patent No.: US 8,508,191 B2
(45) Date of Patent: Aug. 13, 2013

(54) SYSTEM FOR SCHEDULING BATTERY CHARGE AND DISCHARGE IN A RECONFIGURABLE BATTERY

(75) Inventors: Hahnsang Kim, Ann Arbor, MI (US); Kang G. Shin, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 434 days.

(21) Appl. No.: 12/846,049

(22) Filed: Jul. 29, 2010

(65) Prior Publication Data
US 2011/0025258 A1 Feb. 3, 2011

Related U.S. Application Data

(60) Provisional application No. 61/229,291, filed on Jul. 29, 2009.

(51) Int. Cl.
*H02J 7/00* (2006.01)
(52) U.S. Cl.
USPC ............ 320/121; 320/122; 320/132; 320/136
(58) Field of Classification Search
USPC ................. 320/117, 120, 121, 122, 128, 132, 320/134–136
See application file for complete search history.

(56) References Cited

U.S. PATENT DOCUMENTS

| | | | |
|---|---|---|---|
| 4,175,249 A | 11/1979 | Gruber | |
| 4,894,764 A | 1/1990 | Meyer et al. | |
| 5,898,291 A | 4/1999 | Hall | |
| 6,873,133 B1 * | 3/2005 | Kavounas | 320/103 |
| 7,075,194 B2 | 7/2006 | Weidenheimer et al. | |
| 7,609,031 B2 * | 10/2009 | Benckenstein et al. | 320/118 |
| 7,692,404 B2 * | 4/2010 | Harris | 320/117 |
| 2004/0101744 A1 | 5/2004 | Suzuki | |
| 2005/0052154 A1 | 3/2005 | Kavounas | |
| 2005/0242776 A1 | 11/2005 | Emori et al. | |
| 2006/0092583 A1 | 5/2006 | Alahmad et al. | |
| 2006/0164038 A1 | 7/2006 | Demers et al. | |
| 2009/0085553 A1 | 4/2009 | Kumar et al. | |

OTHER PUBLICATIONS

International Search Report and Written Opinion dated Nov. 29, 2011 from corresponding International Patent Application No. PCT/US2011/031535.

* cited by examiner

*Primary Examiner* — Richard V Muralidar
(74) *Attorney, Agent, or Firm* — Harness, Dickey & Pierce, P.L.C.

(57) ABSTRACT

Effective scheduling of battery charge and discharge activities, by making the most of battery characteristics, can extend the battery pack's operation-time and lifetime. A system and method for scheduling battery activities is disclosed. This framework dynamically adapts battery activities to load demands and to the condition of individual battery cells, thereby extending the battery pack's operation-time and making them robust to anomalous voltage imbalances. The scheduling framework includes two components. An adaptive filter estimates the upcoming load demand. Based on the estimated load demand, a scheduler can determine the number of parallel-connected battery cells to be discharged. The scheduler also effectively partitions the battery cells in a pack, allowing the battery cells to be simultaneously charged and discharged in coordination with a reconfigurable battery circuit.

16 Claims, 10 Drawing Sheets

SYSTEM FOR SCHEDULING BATTERY CHARGE AND DISCHARGE IN A RECONFIGURABLE BATTERY

This application is claims benefit of U.S. Provisional Application No. 61/229,291 filed on Jul. 29, 2009. The entire disclosure of the above application is incorporated herein by reference.

FIELD

The present disclosure relates to a system for scheduling battery charge and discharge that employs scheduling policies that allow battery cell activities to adapt to load demands and the conditions of individual cells.

BACKGROUND

Customers will eventually replace their gasoline-powered vehicles with rechargeable models. Accordingly to a McKinsey report by 2015, approximately 2 million electric vehicles (EVs) will be sold around the world. This replacement will lead to substantial decrease in carbon footprint. For instance, the replacement of 77% of all transport miles with EVs will reduce carbon intensity by 94% over the 1990 numbers. To meet this demand, automotive companies are taking tremendous efforts on enhancing battery technologies including battery cell manufacturing and pack manufacturing. In particular, in battery pack manufacturing, battery management is essential so as to make the performance of rechargeable batteries competitive with, and attractive alternatives to, conventional gasoline engines.

To improve battery performance, battery management needs 1) cell balancing and 2) the prevention of the overcharge and deep-discharge of battery cells. Since characteristics of individual battery cells are not the same, strong cells can put stress on weak cells, and vice versa. Cell balancing is also very important for battery health. On the other hand, when a lithium-ion cell (that has high electrical energy concentrated in a small volume in the cell) is overcharged, active materials therein will most likely react with other materials and electrolytes, potentially causing an explosion, let alone damaging the cell itself. When the cell is deep-discharged, or it continues to be discharged, despite its terminal voltage below a certain threshold called the cutoff voltage, it may become short-circuited, transitioning the cell into an irreversible condition. When the cells are connected in parallel it is important to balance their voltages, since their interactions and dependencies make their voltages drift apart. Higher-voltage cells may then inversely charge the lower-voltage cells, causing the entire terminal voltage to drop from the desired value of the parallel—connected cells. Moreover, a lithium-ion cell has unique characteristics, such as discharge efficiency (the higher the discharge rate, the lower the deliverable capacity), and recovery efficiency (the interface-concentrated gradient inside the cell is diffused during a 'rest,' after which the cell can be charged with large electric current over a short time).

Given series-connected cells, various methods for cell—balancing exist. First, cells with a higher state-of-charge (SoC) than others use up their redundant energy. For instance, when there are cell A and B each that have 60% and 50% SoCs, cell A burns 10% of its SoC to equalize SoC. Although this method is undesirable from the energy efficiency perspective, it has been adopted in industries due to the simplicity of the implementation of it. Alternatively, cells with a higher SoC are used to charge cells with a lower SoC. The redundant energy is stored in an inverter, and then the inverter is used to charge cells with a lower SoC. In this method, energy loss is important to minimize in converting DC to AC and vice versa.

Given parallel-connected cells, we can schedule their charge, discharge, and rest activities. For instance, each cell can be discharged in a round-robin fashion. Furthermore, the amount of discharge time can be scheduled in proportion to the remaining charge current in the corresponding cell, indicated by the state-of-charge (SoC) level. In general, however, no single mechanism outperforms the others in all circumstances, thus calling for a thorough study of this issue.

Three main challenges exist in scheduling charge, discharge, and rest activities as well as cell-balancing, for large-scale battery systems. First, a scheduling framework should operate reasonably well in all circumstances. That is, using the framework, one should be able to extend a battery cell's operation-time as much as any other scheduling mechanism can. By 'operation-time,' we mean the cumulative time of the charge current drawn from a battery cell until the cell no longer delivers the required charge current to applications. That is, the operation-time ends when the terminal voltage of the cell falls below the cutoff voltage. To extend the cell's operation-time, we need to understand the battery characteristics, such as the discharge and recovery efficiency.

Second, a scheduling framework should be robust to (inevitable) cell failures in a large-scale battery pack in which cells interact with, and depend on, each other. The terminal voltage of a weak cell with low capacity tends to drop quicker than other cells in use. The voltages of all cells (including the weak one) must remain balanced. When a weak cell cannot reach the full charge owing to high self-discharge, and/or becomes short-circuited, healthy cells could be overcharged.

Third, series-connected battery cells are important to balance while overhead, e.g., energy efficiency, for cell balancing is kept minimum. Cell balancing should not only keep the battery cells healthy, but also extend their operation-time, in which significant overhead is undesirable.

This section provides background information related to the present disclosure which is not necessarily prior art.

SUMMARY

In one aspect of this disclosure, a battery management system is provided for managing a plurality of battery cells arranged in reconfigurable circuit paths. The battery management system includes a scheduling module that receives an estimated load demand for the plurality of battery cells and determines a subset of the plurality of battery cells needed to meet the load demand, wherein the number of battery cells in the determined subset is inversely correlated to a rate at which the plurality of battery cells recover voltage in a rest state. The schedule module further controls a plurality of switches that selectively interconnect the battery cells to connect the subset of battery cells to discharge terminals.

In another aspect of the disclosure, a method is provided for scheduling battery cells for charging and discharging in a reconfigurable battery system. The method includes: monitoring state of charge for each of a plurality of battery cells; partitioning the plurality of battery cells into a group of cells eligible for discharging and another group of cells eligible for charging in accordance with the state of charge of the battery cells; charging one or more battery cells in the group of cells eligible for charging while one or more battery cells in the group of cells eligible for discharging are being discharged; and reassigning the plurality of battery cells into either the group of cells eligible for discharging or the group of cells eligible for charging after the step of charging one or more battery cells.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
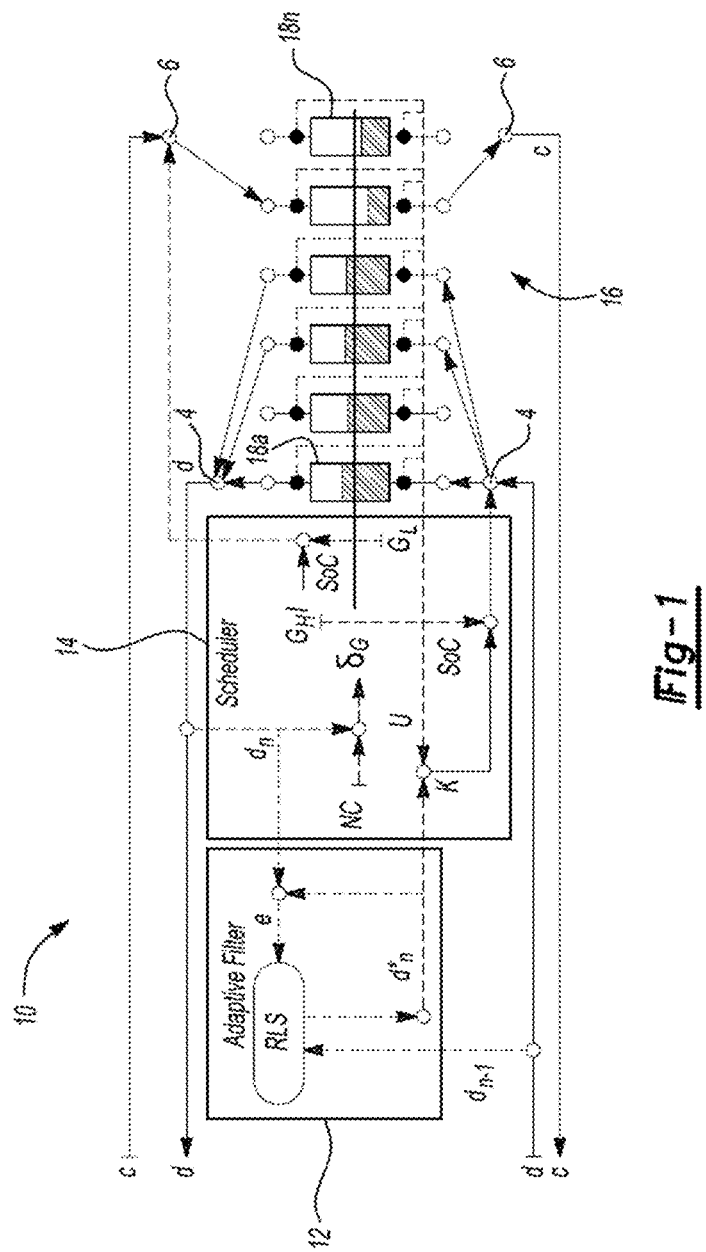
FIG. 1 is a diagram depicting an exemplary battery management system for scheduling battery charge and discharge.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIG. 1 depicts an exemplary battery management system 10. The battery management system 10 is comprised an adaptive filter module 12, a scheduler module 14 and a plurality of battery cells 18a-18n arranged in reconfigurable circuit paths. For purposes of this disclosure, a battery cell can refer to a single battery cell, a series chain of battery cells, a battery module, or a battery pack. The plurality of battery cells 18 are selectively interconnected to charger terminals 4, discharge terminals 6 and/or to each other by a plurality of switches (not shown). An exemplary arrangement for a reconfigurable battery cell circuit is described in U.S. patent application Ser. No. 12/757,293 filed on Apr. 9, 2010 and incorporated herein by reference. Other types of reconfigurable circuit arrangements are also within the scope of this disclosure.

Briefly, the input to the adaptive filter 12 is a history of the loads measured at certain intervals. An estimate of the upcoming load demand is output by the adaptive filter to the scheduler 14. The scheduler 14, using feedback from the battery cells 18, manages charge, discharge and rest activities. The schedule 14 is responsible to solve for a group threshold, $\delta_G$, with which to partition the cells into two groups and determine, k, the number of cells in one group of cells which is to be discharged. These two parameters are periodically updated and adapted to various loads. Particularly, the two groups partitioned via $\delta_G$ can be charged and discharged simultaneously. Each of these functions is further described below.

In an exemplary embodiment, the scheduler 14 implements a main scheduling program. Referring to the pseudo-code below, the main scheduling program involves offline and online procedures.

---
Main program:

Γ: reference to cell characteristics;
Create/Update Γ; /* offline procedure */
every $\delta_t$/ */ online procedure */
  Estimate a load demand (d*);
  Set a scheduling ratio (τ);
  For j = 1 : τ
    Monitor SoC levels of all cells;
    Partition cell array into $G_H$ and $G_L$;
    Determine $G_k$ and $G_c$;
    Connect $G_k$ to discharge circuit or
    Connect $G_c$ to charge circuit;

---

In an offline procedure, the program creates the reference to the battery characteristics via the charge-and-discharge cycle; this cycle may repeat several times. The reference describes the average cell characteristics that include the voltage recovery factor (v), the terminal voltage, and the cutoff voltage. In an online procedure, the program may update the reference since the physical condition of cells changes over time as long as the charge-and-discharge cycle is repeatedly scheduled. In particular, the update of v is periodic, effectively offsetting a cell's aging effect. When any application runs or the battery-cell array connects to the power, every $\delta_t$, the adaptive filter estimates an upcoming load demand. The estimating may incur a high computational complexity. Also, the load demand may fit into a large time scale, e.g., on the order of minutes. As a result of this, a scheduling ratio (τ) is created by which the scheduling as a subroutine may run faster than or as slow as the estimating. The subroutine includes monitoring SoC levels, partitioning the battery-cell array, determining $G_k$ for discharge and $G_c$, for charge, and manipulating the battery circuit for either discharge or charge, or both.

Figure 2:
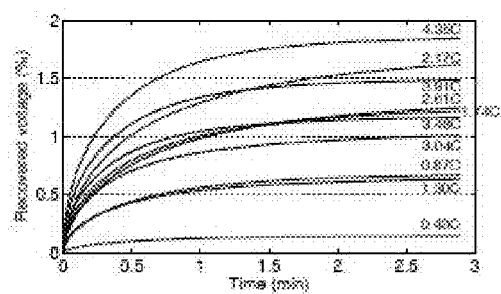
FIG. 2 is a graph illustrating voltage recovery with respect to different discharge rates.

Battery characteristics develop differently as batteries are repeatedly charged and discharged. This changing development of battery characteristics requires periodic updates on the reference including the recovery-efficiency factor. The update is performed offline in two manners with a batch of discharge and rest periods executed. On one hand, according to the batch, changes in voltage are recorded while the cycle of battery discharge and rest is repeated, resulting in time-varying data. From these data, parts that capture the recovery of voltage are extracted. To do so, turning points are detected by comparing the previous decrease with the following increase. After turning points are pinpointed, partial data from one point to the next are extracted. A set of these data are then fed into the function $F_r$. On the other hand, the partial data can be obtained while the battery rests. That is, the measurement of battery voltage and the execution of the batch simultaneously take place. Consequently, as a result in either of these two manners, a set of graphs on recovery is generated as shown in FIG. 2. Also, from this set we extract the property of discharge efficiency. More details will be described below.

The frequency of the profiling depends upon a residual time (i.e., the period of time elapsed after the last execution) and the battery age. In particular, the battery age is critical in the sense that the older the battery, the higher the unpredictability in battery dynamics. So, the profiling is required more frequently for older batteries. Although the frequency is highly subject to battery chemistry, generally speaking, for lithium-ion batteries for EVs, biweekly profiling is expected for more than 5-year old batteries, while monthly profiling for less than 5-year old ones.

The adaptive filter 12 functions to estimate upcoming load demand for the battery cells based on previous load demand measures. In an exemplary embodiment, the adaptive filter 12 uses a recursive least-squares (RLS) algorithm and measures and records loads including $d_{n-1}$ at p+1 intervals (i.e., (p+1)× Δt), yielding a history of the loads, $u(n-1)=[d_{n-1} \ldots, d_{n-p-1}]^T$. Since the importance of each element in u(n-1) is different, u(n-1) is weighted by a vector filter $w_{n-1}=[w_{n-1}(0), w_{n-1}(1), \ldots, w_{n-1}(p)]^T$, estimating the load demand, $d^*_n$ in the next Δt as:

$$d^*_n = w_{n-1}^T u(n-1). \quad (1)$$

Next, the estimation error should be minimized:

$$e(n) = |d_n - d^*_n|. \quad (2)$$

Since the filter weights/coefficients dictate the estimation error, we solve for the filter coefficients to do so. A weighted-least-squares error function is applied as a function of e(n):

$$f(w_n) = \sum_{i=0}^{n} \lambda^{n-i} |e(i)|^2, \quad (3)$$

where 0<A<1 is an exponential forgetting factor that effectively limits the number of input samples; the smaller the value of A, the more sensitive to recent samples the filter becomes, causing more fluctuations in the filter coefficients.

The number of operations required for calculation of $w_n$ grows proportionally to n, as the number of columns in u(n) increases. To avoid the repetitive execution of the least squares algorithm in updating $w_n$, we apply RLS as:

$$w_n = w_{n-1} + \Delta w_{n-1}, \quad (4)$$

where $\Delta w_{n-1}$ is a correction factor expressed as e(n).g(n), where g(n) is a gain vector. g(n) is obtained by solving the following equation:

$$g(n) = \frac{P(n-1)u(n)}{\lambda + u^T(n)P(n-1)u(n)}, \quad (5)$$

where P(n) is a (p+1)×(p+1) inverse correlation matrix. P(n) is solved recursively via $$P(n) = \lambda^{-1} P(n-1) - g(n) u^T(n) \lambda^{-1} P(n-1), \quad (6)$$

where $P(0) = \eta^{-1} 1$, 1 is the (p+1)×(p+1) identity matrix and η is a positive constant. The RLS algorithm, thus, provides an effective way of updating the filter while reducing the computation overhead, yielding an estimate of the load demand d*, that will be passed to the scheduler. Other techniques for estimating load demand for the battery cells fall within the broader aspects of this disclosure.

A system overhead is directly associated with $\delta_t$. A fundamental principle in reducing the overhead is that the higher the predictability, the lower the frequency of the estimation in $\delta_t$. The accuracy in the predictability is assessed with the result of Eq. (2). That is, when an error is negligible.

A battery cell's voltage is partly proportional to its state-of-charge (SoC) level that can be determined by counting coulombs. However, a lower-voltage cell can be at a higher-SoC level than a higher-voltage cell, due to the discharge and recovery efficiency. This discordance suggests that some cells whose voltages fall below the cutoff voltage still have a sufficient charge current to deliver, making it essential to schedule the charge, discharge, and rest activities.

The scheduler 14 manages all cells in the array in accordance with their SoC level, partitioning it into two groups: (1) $G_H$ in which the member cells' SoC level is higher than $\delta_G$, and (2) $G_L$ in which the member cells' SoC level is lower than or equal to, $\delta_G$. Also, when an individual cell's voltage is below the cutoff voltage, the cell is put into $G_L$. There are two reasons for this partitioning. First, the scheduler 14 prevents cells from being deep-discharged, which may otherwise cause an irreversible damage to the cells. If a high load on the cells with a very low SoC level causes their voltage to drop sharply below the cutoff voltage, $G_L$ plays a buffering role to reserve energy, allowing only a low load demand to be met. Second, the scheduler 14 allows cells to be charged and discharged simultaneously. Cells in $G_L$ can be charged while those in $G_H$ are being discharged.

At a high discharge rate, a cell's voltage drops rapidly, while it drops slowly at a low discharge rate. Thus, $\delta_G$ must be dynamically adjusted to the load. This dynamic adjustment is made as $$\delta_G = d^* \times \frac{d^*_{max}}{NC}, \quad (7)$$

where $d^*_{max}$ an estimated maximum load demand within a time interval Δt and NC is the nominal capacity of all of the cells in the array.

Pseudo-code of portioning the cells in the array for charge and discharge activities is provided below.

Partitioning:

$E_{SoC}(G)$: return the average SoC of elements in G;
α: a linear decreasing factor;
$F_S \leftarrow$ Off;
$\delta_G \leftarrow$ Eq. (7); /* updated for discharging */
move cells ($\epsilon G_H$) into $G_L$, conditioning $SoC_{cell} \leq \delta_G$;
if $G_H = \emptyset$
   $\delta_G \leftarrow \delta_G \times \alpha$;/ *decremented */
   move cells ($\epsilon G_L$) into $G_H$, conditioning $SoC_{cell} > \delta_G$;
   $F_S \leftarrow$ On; /* switching kRR to nRR /*
else
   /* balancing the SoC level for charging */
   move cells ($\epsilon G_L$) into $G_H$, conditioning $SoC_{cell} \geq E_{SoC}(G_H)$.

First, the scheduler sets $\delta_G$ based on equation (7). The value of $\delta_G$ is updated during the partitioning. When the SoC level of any cell in $G_H$ is lower than $\delta_G$, the corresponding cells are put into $G_L$. When $G_H = \phi$, i.e., no cells available to be discharged, some cells in $G_L$ are put back into $G_H$ with a decreased value of $\delta_G$. $\delta_G$ is linearly decreased by α<1. A flag, Fs, is turned on, indicating that the SoC level of all cells is too low to meet a high load demand. Thus, the scheduling mechanism is switched to a parallel scheduling method (nRR) from a weighted-k round-robin scheduling method (kRR). Each of these methods are further described below. Conversely, when $G_H$ is not empty, the scheduler checks whether there are any charged cells in $G_L$ whose SoC level is greater tha, or equal to, the average SoC level in $G_H$. If there are, they are placed in $G_H$. As a result, all the cells in the array are classified into the two groups in accordance with their SoC level.

The load demand, d, is to be shared primarily among the cells in $G_H$. Selecting an appropriate value of k is crucial since the more cells become available, the lower the per cell load. For this purpose, based on the recovery-efficiency factor v, and d* from the adaptive filter, k is given by $$k = \frac{d^*}{v}, \quad (8)$$

where $1 \leq k \leq n$, and n is the total number of available cells in $G_H$. Although k is within the range, when the per-cell load is too low (i.e., v>d/k and k>2), k is decreased by 1, thus increasing the per-cell load. When v is in the form of an array, k also becomes an array. This way, k is determined to exploit the recovery efficiency and prevent each cell from excessive discharge.

The scheduler 14 selects k cells with the highest SoC level in $G_H$, referred to as the kRR scheduling, and then determines the per-cell load. Each cell i shares d, weighted by $$d_w = d \times \frac{SoC_i}{SoC_1 + \ldots + SoC_i + \ldots, SoC_k}. \quad (9)$$

This weighted load-share is effective for balancing the voltage of the k cells, even when some of them become faulty.

In an exemplary embodiment, the scheduling mechanism can vary with k. For example, when k=1, at each interval, the cell with the highest SoC level is selected, referred to as round-robin (1RR) scheduling. The 1RR scheduling is effective for balancing the SoC level and voltage of the cells, while it may cause excessive per-cell discharge and the overhead for frequently switching from one cell to another. Second, when the cell remains in connection with the load until it gets fully discharged to the end of its operation-time, this mechanism is referred to as sequential (1+1RR) scheduling. Obviously, the 1+1RR scheduling has nothing to do with voltage-balancing, but it is vulnerable to excessive per-cell discharge, unable to exploit the battery characteristics. Third, when all n cells in $G_H$ are discharged together until the end of their operation-time, this mechanism is referred to as parallel (nRR) scheduling. The nRR scheduling is robust against excessive per-cell discharge, although it fails to exploit the battery characteristics. Conversely, the kRR scheduling acts as 1RR at a low discharge rate and as nRR at a high discharge rate, achieving the merits of all. Note that the kRR scheduling subsumes all of these three scheduling mechanisms.

Pseudo-code of the kRR scheduling of the discharge activity is set forth below.

---

Discharging (method, $F_S$, $G_H$):

N(G): return the number of elements in G;
H(k, G): return k cell(s) with the highest SoC level in G;
A(G): rturn the first available cell in G;
If $G_H$=ø
  return; /* fully-discharged */
switch method
  case 'kRR':

---

Discharging (method, $F_S$, $G_H$):

k ← Eq. (8);
if k > N($G_H$) | $F_g$ is On
  k ← N($G_H$); /* switching kRR to nRR */
$G_k$ ← H(k, $G_H$);
case '1RR':
  $G_k$ ← (H(1, $G_H$);
case '1+1RR':
  $G_k$ ← A($G_H$);
Case 'nRR':
  n ← N($G_H$);
  $G_k$ ← n cells ∈ $G_H$;
Discharge $G_k$ based on Eq. (9);

---

Figure 4:
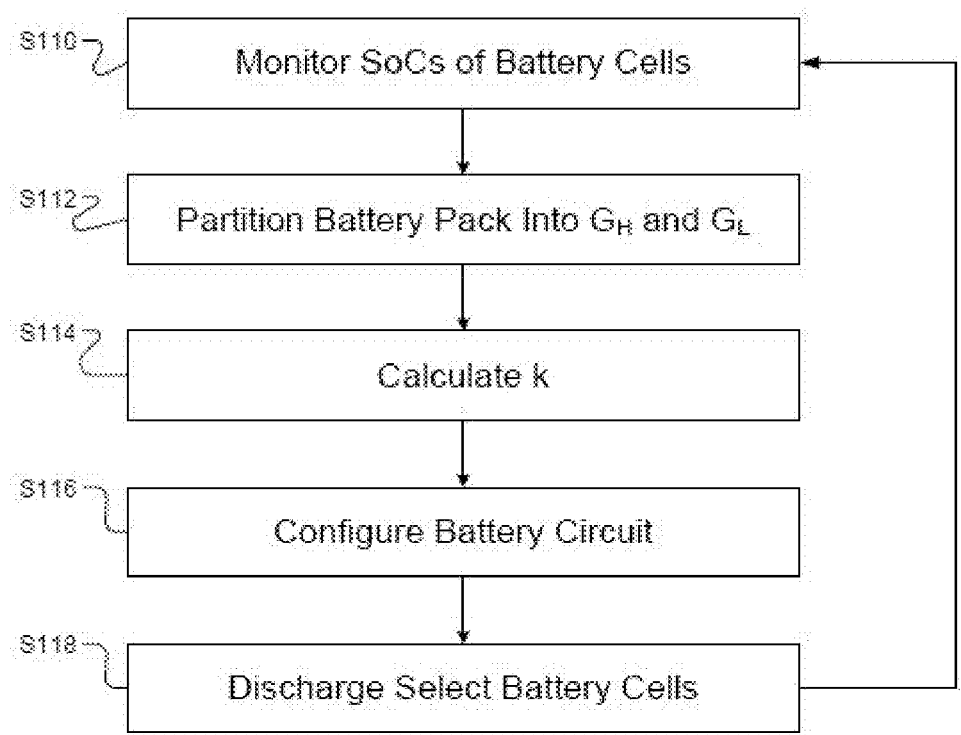
FIG. 4 is a flowchart of an exemplary embodiment of the scheduler in the battery management system.

FIG. 4 depicts an exemplary embodiment of these principles by the scheduler 14. The scheduler 14 continually or periodically monitors the state-of-charge for each cell in the plurality of battery cells 18 as indicated at step S110. At step 112, the scheduler 14 partitions the battery cells into a group of cells eligible for discharging $G_H$ and another group of cells eligible for charging $G_L$ using a cutoff voltage in the manner described above. The scheduler 14 then determines k at step S114.

Given k, the scheduler 14 configures the reconfigurable battery circuit accordingly at step S116. More specifically, the schedule 14 selects k cells from $G_H$ and connects the cells to the discharge terminals, where the cells can be discharged at step S118. Remaining battery cells may be connected to the charge terminals, where these cells can be concurrently charged as further described below. This process is repeated at predetermined time intervals.

Figure 5:
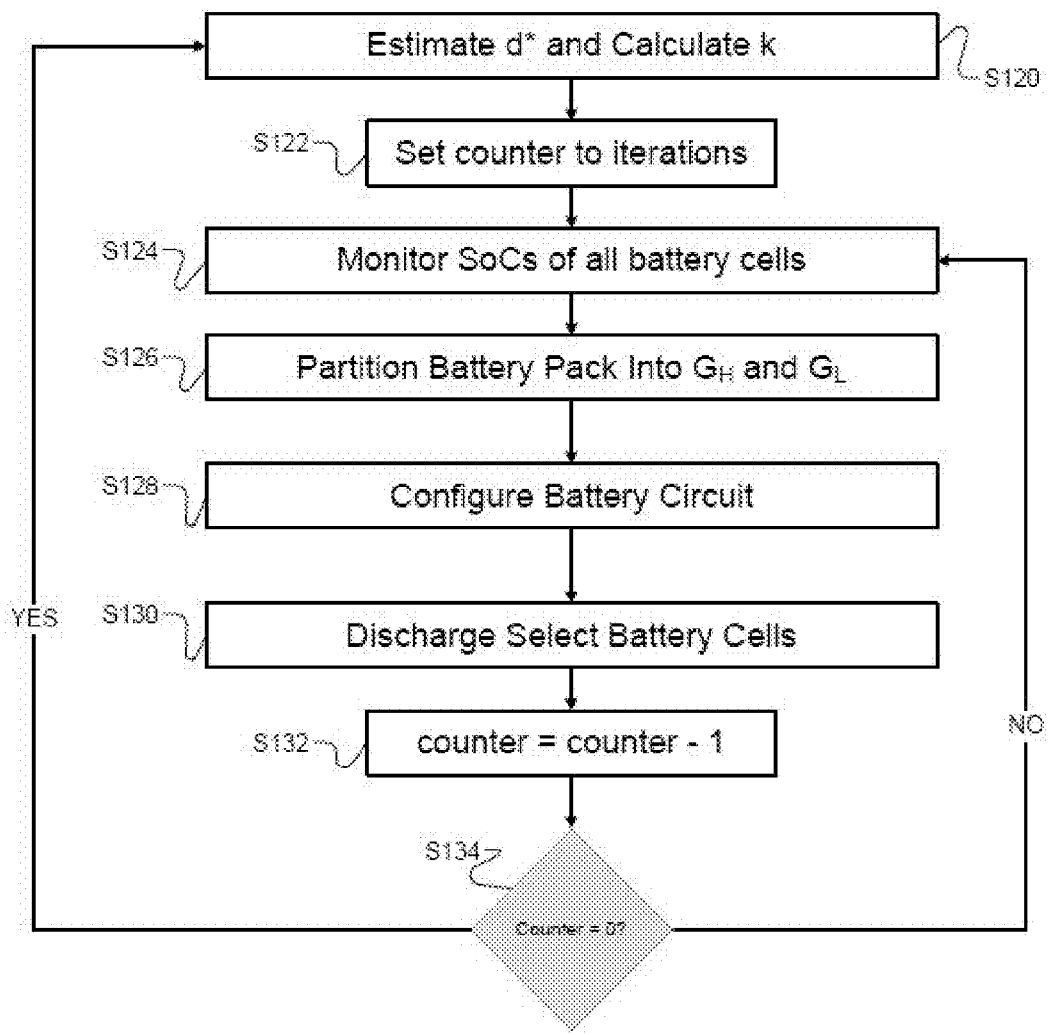
FIG. 5 is a flowchart of another exemplary embodiment for the scheduler in the battery management system.
Figure 6A:
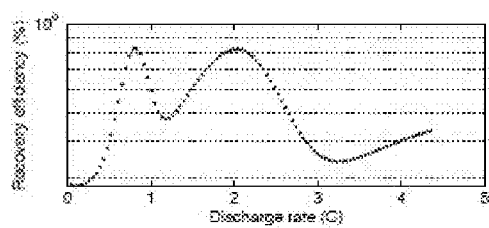
FIGS. 6A-6C are graphs illustrating the relationship between recovery efficiency and other battery cell characteristics.
Figure 6B:
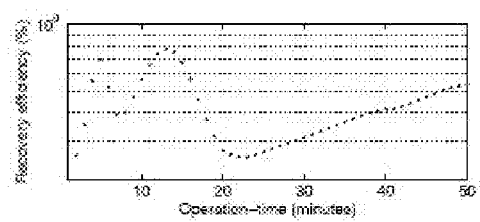
Figure 6C:
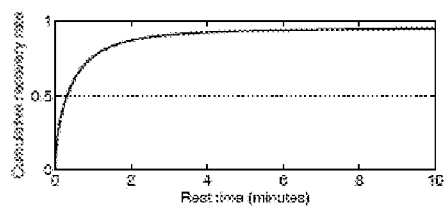
Figure 7:
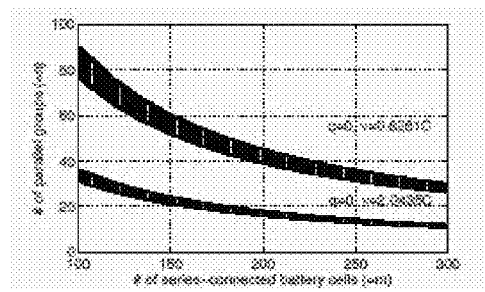
FIG. 7 is a graph illustrating the relationship between the amount of battery cells connected in series and the amount of parallel connected groups of battery cells for a reconfigurable battery circuit delivering a set supply voltage.

An alternative embodiment of the scheduler 14 is shown in FIG. 5. In this embodiment, the scheduler 14 may repartition and reconfigure the topology multiple times for every determination of d*. d* is estimated and k is determined at step S120. Once k is determined then a counter may be set at S122, representing the number of iterations to be performed until d* and k are updated. The counter may be set to a hard coded parameter or can be dynamically calculated in accordance with the estimated load demand. For instance, when the variation of the load demand is high, then k may be calculated more frequently.

The state-of-charge of each battery cell is monitored at step S124. The scheduler 14 then partitions the battery pack at step S126 and configures the reconfigurable battery circuit accordingly at step S128. Battery cells are then discharged during a specified time interval as indicated at step S130. Once the time period lapses, the counter is decremented at step S132. Steps S124 to S134 are repeated until the counter is fully decremented. Once fully decremented, processing continues at step S120. The estimation of a load demand may be costly in comparison to partitioning the battery cells. Accordingly, the estimation of d* and calculation of k may be performed at certain time intervals, and the remaining tasks may be performed more frequently.

The scheduler 14 is also responsible to schedule charging of the battery cells. For the charging process, priority is given to the cells in $G_L$. The cell with the lowest SoC level is selected and charged until its SoC level reaches the average SoC level of the cells in $G_H$. The charged cell is then put into $G_H$. This procedure, called quick average charging, repeats until no cell is left in $G_L$. This way, undesirable cases, such as voltage-imbalances at any point in time, are avoided. After all cells in $G_L$ are charged, the cells in $G_H$ start to be charged. Unlike the way applied in $G_L$, all the cells in $G_H$ are charged at the same time. The reason for this is that despite the unpredictable disruption of the charging process, the cells should be available to be discharged without the concern of voltage-imbalances. To prevent any cells from being overcharged, the charging process stops whenever any of the cells in $G_H$ is fully charged. Then, individual cells with a lower-SoC level are separately charged.

Pseudo code of the kRR scheduling of the charge activity is set forth below.

---

Charging ($G_H$, $G_L$):

$V_n$; nominal voltage;
L(k, G): return k cell(s) with the lowest SoC level in G;
If $G_L = \emptyset$
  /* The discharge process is inactive */
  $G_c \leftarrow G_H$;
else if $G_H = \emptyset$
  $G_c \leftarrow G_L$
else
  /* The discharge processes can be active */
  $G_c \leftarrow L(1), G_L$);
Charge cell(s) ($\in G_c$ & $V_{cell} < V_n$) /* Prevention of overcharge

---

The quick average charging is resilient against overstresses that occur to the cells experiencing an intensive charge-and-discharge cycle. To illustrate this, suppose a simple policy is used where individual cells in $G_L$ are deferred from their transfer to $G_H$ until they are fully charged. In this policy, when the charging process is switched to the discharging process, a just-fully-charged, weak cell-note that a weak cell may be charged and/or discharged faster than healthy cells-is likely selected first for discharge due to its higher-SoC level, and then continues being discharged until its SoC level reaches the average SoC level of the cells in $G_H$. At a high discharge rate, the weak cell's SoC level, however, falls below $\delta_G$ faster than that of the healthy cells which is also close to $\delta_G$, thus transferring the weak cell back to $G_L$. Then, the weak cell is most likely selected for charge again. As a consequence, the cycle of charging and discharging the weak cell makes it weaker, eventually leading to its failure.

The SoC of series-connected battery cells is important to keep balanced. As mentioned earlier, the cycle of charging and discharging real-life cells makes their characteristics drift apart. This development is caused by several reasons including possible defects in cell manufacturing, packaging, and management. For this reason, cell balancing in battery management helps extend the operation time of the entire pack and mitigate the stress imposed on individual battery cells, ultimately resulting in the improvement of their state of health.

Figure 3:
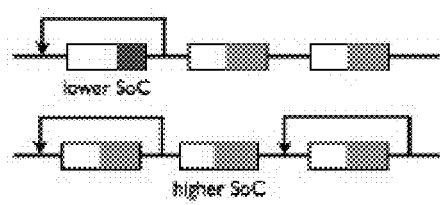
FIG. 3 is a diagram depicting an arrangement by which battery cells are bypassed for cell balancing.

One method for cell balancing is to bypass battery cells with a lower SoC. As shown in FIG. 3, cells with a lower SoC are bypassed or only cells with a higher SoC are connected to the load. In this method, a question about how much to stay the cells connected to, or bypassed from, the load must be answered. Three exemplary timing policies are described below. Battery cells can be bypassed using the reconfigurable battery cell circuit noted above as well as other arrangements.

Suppose that there are m series-connected battery cells, whose SoCs are $SoC_1, SoC_2, \ldots, SoC_m$. Then, the current (in coulomb) drawn from this series chain equals $$\frac{d_w}{\sum_{i=j}^{m} v_i},$$

where $d_w$ is a load demand from equation 9 and $v_i$ is cell i's current voltage. We assume that $d_w$ and $v_i$ are relatively constant during a cycle of cell balancing. Also, for simplicity, we assume that adjacent battery cells independently operate to each other.

Provided that $SoC_1 \leq SoC_2 \leq \ldots \leq SoC_m$, we have three policies for cell-balancing:

A bottom-up (BU) policy is a policy that cell 1 with the lowest SoC is bypassed first after the time period, $\Delta t_1$. In the BU policy, all cells are connected to the load in the beginning. Intuitively, the time period, $\Delta t_1$ is determined, based on a load demand, i.e., a discharge rate. The discharge rate equals $$\frac{d_w}{\sum_{i=j}^{m} v_i}.$$

Thus, the time period during which cell j is connected is $$\Delta t_j = \Delta t_{j-1} + \frac{NC(soC_j - SoC_{j-1})\sum_{i=j}^{m} v_i}{d_w} \quad (10)$$

where NC is nominal capacity of a cell. When j=1 for cell 1, $SoC_0$, and $v_0$ each equal 0.

A top-down (TD) policy is a policy that cell m with the highest SoC is exclusively connected for $\Delta t_m$ in the beginning. After the discharge of $NC \cdot (SoC_m - SoC_1)$ from cell m, cell m−1 is then exclusively connected. The discharging cascades down to cell 1. Thus, a discharge rate equals $$\frac{d_w}{v_j}$$

with cell j connected. As a result, the time period during which cell j continues being discharged is $$\Delta t_j = \frac{NC(Soc_j - SoC_1)v_j}{d_w} \quad (11)$$

A median (MD) policy is a policy that all cells but the lowest-SoC one are connected to the load. The connected cells are discharged until the total discharge equals the median of precedent levels of SoC, i.e., $SoC_c$ that minimizes $E(|SoC_j - SoC_c|)$, where $1 < j \leq m$ and E is the mean. Thus, the median is computed for the connected cells (i.e., excluding cell having lowest SoC. In an exemplary embodiment, the connected cells are discharged for a period of time that is computed as a function of the median, $SoC_c$. More specifically, the time period during which cell j is connected is $$\Delta t_j = \Delta t_{j-1} = \frac{NC \cdot SoC_c \sum_{i=2}^{m} v_i}{d_w} \qquad (12)$$

where cell having the lowest SoC is designated with i=1. Unlike the BU and TD policies, instead of achieving complete cell-balancing, the MD policy limits the number of cells to be connected to the load. This way allows the SoCs of the entire cells to converge in the long run, and the stress imposed on the individual cells to be mitigated.

The BU and TD policies have the same period of scheduling i.e., $$\Delta t = \sum_{i=1}^{m} \frac{NC(SoC_i - SoC_1)v_i}{d_w} \qquad (13)$$

However, at a high discharge rate, the BU policy can impose on individual cells less stress than the TD policy. As will be described below, when a cell is excessively discharged, it experiences lack of available SoC and drops of terminal voltage, which is critical especially at a low SoC level.

At each period of $\Delta t$, the difference in SoC is checked across the series-connected cells. When the difference exceeds a threshold, i.e., $$\delta_c > \frac{\min(SoC_1, SoC_2, \ldots, SoC_m)}{\max(SoC_1, SoC_2, \ldots, SoC_m)}; \qquad (14)$$

cell balancing is activated. The larger the value of $\delta_c$, the more frequently cell balancing is performed, and the more fine-grained it becomes. Conversely, a smaller value of $\delta_c$ may incur stress on the battery cells at a high discharge rate. Thus, their tolerance should also be included in determining be, which varies with applications. Alternatively, instead of measuring the SoC of individual cells, their voltage can be an indicator to gauging the current SoC. Generally speaking, however, voltage oscillates depending on variable discharge rates. Nevertheless, it is often used in automotive industry as correlated with battery capacity.

Batteries of the same kind can have different characteristics depending mainly on manufacturers and their usage pattern. Usage pattern can be simulated and evaluated via a stochastic model of battery behavior. In this section a way of profiling the battery characteristics is described that include discharge efficiency and recovery efficiency.

A high discharge rate affects greatly the cell's operation-time. That is, the higher the discharge rate, the less efficient the conversion of the cell's chemically-stored energy to electrical energy, thus degrading more in the deliverable capacity. According to a preliminary study, a cell of 3600 mAh capacity takes 1 hour to be fully discharged at rate C-1 coulomb is drawn every second. If the discharge rate doubles, its deliverable capacity decreases by 4.7%.

Although the shape of voltage-drop curves may differ in different kinds of a battery, the voltage-drop curves of a battery for different discharge rates are very similar or even the same. That is, increasing the discharge rate by 1 C decreases the operation-time by 50%. Given the curve-shape similarity, the relationship between the voltage-drop curves with respect to the operation-time can be derived. First, a nonlinear voltage curve at a constant discharge rate iC is defined as an invertible function, $F_i:t \rightarrow V$. Specify the curve $F_{ref}$ with the constant discharge rate C as a reference. Then, the operation-times associated with $F_{ref}$ correspond to those with $F_i$, based on their shape similarity:

$$F_i(t_i)=F_{ref}(t_r), \qquad (15)$$

where $t_i(t_r)$ is in the operation-time domain of $F_i(F_{ref})$. The reference operation-time can be solved offline by using simple linear curve fitting. On the other hand, the relationship between $t_i$ and $t_r$ is expressed as $$t_i=F_i^{-1}F_{ref}(t_r). \qquad (16)$$

The relationship $F_i^{-1}F_{ref}$ can be approximated to be a set of linear functions $\pi=\{\pi_1, \pi_2, \ldots, \pi_i, \ldots, \pi_n\}$, where $\pi_i(=\alpha*t+b)$ is differentiated by the discharge rate. For instance, given two points in the operation-time domain with a discharge rate iC, two corresponding points in the operation-time domain are obtain via $\pi_i$. These two points are then applied to $F_{ref}$, yielding a voltage drop.

A battery cell has a limited charge recovery effect at a high discharge rate; a high load for a short period of time causes a high interface-concentrated gradient among electro-active species inside the cell, making the usable charge temporarily unavailable due to the lag between reaction and diffusion rates. Thus, when the cell is allowed to 'rest' for some time at a low (or zero) discharge rate, the voltage that dropped temporarily goes back up, referred to as the recovery efficiency.

The recovery effect depends on the discharge rate, the discharge time, and the rest time. First, the recovery effect is proportional to the relationship, however, is not linear, as shown in FIG. 4A, because the diffusion process occurs even during the course of the low-discharge activity. From the recovery-efficiency curve, one can find local optimal discharge rates that maximize the recovery efficiency. For instance, when the cell is discharged at 0.8261 C or 2.0435 C, its recovery effect is locally maximal. Second, the discharge time over which the cell is continuously discharged has a similar effect on the recovery efficiency as shown in FIG. 4B. For instance, when the cell is discharged for 5 or 13 minutes at 0.8261 C, the recovery efficiency is locally maximal. Third, most of the charge current that has been temporarily unavailable is recovered after a short rest. FIG. 4C shows the average cumulative recovery rate with respect to the rest time. 70% of the dropped voltage is recovered within one minute, and 85% within two minutes.

The correlation among these three elements indicates the monitoring interval at which the charge, discharge, and rest activities should be scheduled and the number of parallel-connected cells to be discharged, yielding the recovery-efficiency factor, v. For this purpose, we need to establish the correlation, denoted by the function $F_r: c \times t_d \times t_r \rightarrow V$, where $c, t_d$, and $t_r$ are the discharge rate, the discharge time and the rest time, respectively.

Solving for $F_r$ can be facilitated by applying a multivariate linear regression for each given value of $t_r$, yielding a set of functions. We compute the first-order derivative of $F_r$ with respect to c, and solve $$\frac{dFr}{dc}=0$$

for v, as dc→0. Since we are interested in local maxima, v is filtered under the condition that $$\frac{d^2 F_r}{dc^2}<0.$$

As a result, v is used to determine k, the number of parallel-connected cells, which will be detailed next.

Solving $F_r$ is treated as a linear least squares (LLS) problem: $\min_x |b-Vx|$, where V is an m-by-n matrix, b is a given m element vector, and x is the n element solution vector. To solve an LLS problem with time-varying data, z, based on various discharge rates, we apply the most common of the factorizations, QR factorization: V=QR, where V is an m-by-n Vandermonde matrix weighted with w-in our case, w=z, Q is an m-by-n orthogonal matrix, and R is an n-by-n upper triangular matrix. After the decomposition of V into Q and R, e.g., via GramSchmidt process, the vector, x is solved by computing $R^{-1}\cdot(Q^T\cdot(w\cdot z))$. Accordingly, we obtain the 2D polynomial of discharge rate and soc with degree n, i.e., $$f_v^n(d,s)=\alpha_{00}+\alpha_{10}d+\alpha_{01}s+\alpha_{20}d^2+\alpha_{11}ds+ \quad (17)$$

where coefficients are presented in Appendix. Note that this function is contingent upon z that results from specific characteristics of a battery which is, in our case, the MCMB 2528 Graphite model (Bellcore) that has the active materials of LiPF6 and the electrodes of Cobalt dioxide (LiCoO2), specifying open-circuit potential of positive 4.2417 volt.

Clearly, the more cells included in the array, the higher the power it can deliver, but the costlier its manufacturing. Also, the efficiency of converting chemical energy to electrical energy is nonlinear, depending on applications including all components of an electric vehicle. This question must then be narrowed down to how many parallel-connected cells are necessary to allow the battery-cell array to be both schedulable and long-lasting.

Given the requirement of p watts where 745.70 watts is equivalent to 1 mechanical horsepower (HP), the cells are best to be connected in series and in parallel as follows:

$$p=m\cdot V\times(1+q)\cdot n\cdot v, \quad (18)$$

where m and n are the numbers of series-connected cells and parallel groups, respectively; V is a cell's discharge varying output voltage; q is the redundancy factor, where $q\leq 0$. When q=0, no redundant parallel groups are available for scheduling. Obviously, the higher the redundancy, the higher the schedulability.

Figure 11:
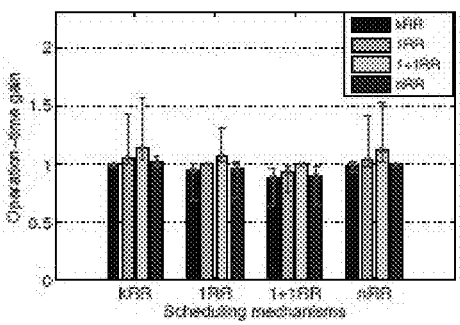
FIG. 11 is a graph illustrating comparisons of the operation times of various scheduling methods.

Suppose that 35 HPs, on average, is required for an electric vehicle. Then, how many parallel groups should we have while exploiting v? This depends mainly upon the required supply voltage and v. As shown in FIG. 11, the higher the supply voltage, the fewer the number of parallel groups, with the discharge rate adjusted to v. Without redundancy, at a high discharge rate (the average electric current is set to v=2.0435 C) with the supply voltage of 615V (m=150), on average, 23 parallel groups are required. At a low discharge rate (v=0.8261 C) with the same voltage, average 57 groups are required.

A discharge profile is defined as workload, p, over the operation-time, i.e., a sequence of variable loads, ds, required. In the discharge profile, ds are approximated by piece-wise constant loads, i.e., represented by a set of M levels of the discharge rate, $(i_1, \ldots, i_m)$, where M is used to characterize d, given $\Delta t$ that is a fraction of the total operation-time, T. As discussed earlier, the smaller the value of $\Delta t$, the higher the accuracy in characterizing p. In case $\Delta t = T$, ds are considered constant. The load at time t is denoted as a step-wise function of time, $$d(t) = \sum_{j=1}^{T} p(j)\cdot 1_{[t_{j-1}, t_j)}(t), \quad (19)$$

where 1 [) (t) is an indicator function. p can be obtained from empirical measurements. For the purpose of evaluation, we generate a synthetic discharge profile, such that $d(i)=d(i-1)+\gamma$, where $\gamma$ is an increment or decrement that is expressed by a random discharge that follows a Gaussian distribution.

The goal is to extend a battery pack's operation-time and lifetime—defined as the duration during which the pack provides required (converted) electrical energy to the load while each of its cells repeats the charge-and-discharge cycle—by effectively scheduling charge, discharge, and rest activities. To evaluate the efficacy and efficiency of the weighted-kRR scheduling, the metrics used include the battery pack's operation-time and usability, and the reduction in voltage-imbalance between parallel-connected cells in the pack.

First describe the evaluation setup and then, based on the metrics, demonstrate the superior performance of the kRR scheduling over the other three scheduling mechanisms: 1RR, 1+1RR, and nRR.

A battery management emulator is designed that includes the four scheduling mechanisms, discharge profile, and battery-activity profiling. Two-step recovery effects are considered in the battery-activity profiling: Cells are rested for $\Delta t$ or $2\times\Delta t$, where $\Delta t=1$ (minute). To generate a reference including $F_{ref}$ and $\pi$ presented above, the Dualfoil simulation technique described in the publications from Marc Doyle, Thomas F. Fuller and John Newman. Note, however, that the evaluation results in this section are not subject to Dualfoil's accuracy in the emulation. Dualfoil simply offers a reference to lithium-ion cell characteristics as most battery manufacturers do.

The battery management emulator uses the discharge profile, p, specified in equation (19). In p, the random discharge y is normally distributed as $$\gamma \sim d_l \times N(O, o.5), \quad (20)$$

where $d_l=0.4\ C\times\Delta t$ which is a lower bound of p. The upper bound, $d_u$, of p is set to $4.3\ C\times\Delta t$. Also set $d_{max}$ and d(0) to $d_u$, and $d_l$, respectively. Based on these parameter values, specify the discharge profile. Given the discharge profile, the battery management emulator simulates the cell discharge according to each scheduling mechanism. The battery pack is assumed to contain 4 parallel-connected cells, but it can be extended in various ways, e.g., n parallel-connected battery packs of m-series-connected cells. In addition to the discharge profile, we set a cell's nominal capacity (NC) to 3602.7 mAh, assuming that all cells in the battery pack have the same characteristics, unless otherwise specified. Also, the cell's terminal and cutoff voltages are set to 4.06267V and 2.00000V respectively.

For the purpose of the cell-balancing evaluation, separately set a load demand as a constant discharge rate of 0.5 C (or 1011567 W), and $\delta_c=0.99$. Also, consider an efficiency vector for the discharge of individual cells as [0.99, 0.95, 0.99, 1.00 0.98]. This means that actual coulombs drawn from individual cells are more than 100%, e.g., 101% and 105% for the first and second cells, respectively. Last, it is assumed that the cell-balancing is checked every 0.5 seconds.

Figure 8A:
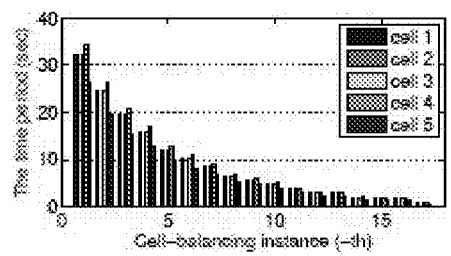
FIGS. 8A-8C are charts comparing cell balancing periods for different discharge policies.
Figure 8B:
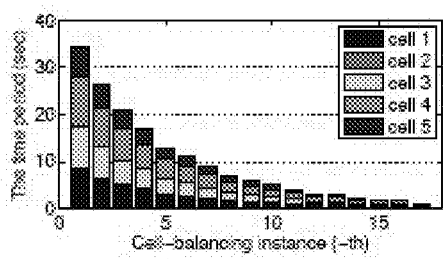
Figure 8C:
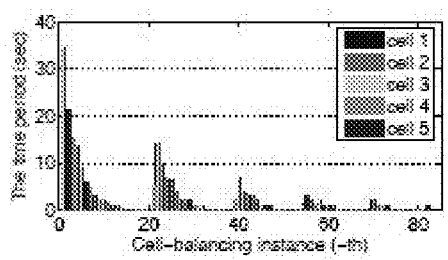

BU, TD and MD policies calculate the time period during which cells are connected to the load. This calculation is based on remaining SoCs of individual cells. The higher the accuracy, the shorter the time period. With reference to FIGS. 8A-8C, when the cell-imbalance over series-connected cells is detected for the first time, it takes 34 seconds for cell balancing in both the BU and TD policies, and this period decreases by 24% for the second time, while the MD policy gets a 38% decrease. In the case of both the BU and TD policies, over time, the cell-imbalance is quickly mitigated, decreasing the time period for it. By contrast, in the case of the MD policy, a course of the time periods appear serrated due to the indiscriminate timing; the same time period is applied to individual cells. Nevertheless, as shown in FIG. 8C, the MD policy effectively mitigates the cell-imbalance over time. As a result, all three policies keep series-connected cells perfectly equalized with a 1% tolerance (i.e., $\delta$, =0.99).

Cell 2 acts as a base line throughout the operation-time. This means that it is relatively discharged faster (or always at a lower SoC level) than the other four, implying that cell 2 may be the weakest of all, which can be hypothetically inferred from the fact that the weaker the battery cell, the smaller capacity it has. Accordingly, the analysis of the time periods allows one to detect an anomalous health condition of cells.

Although the load demand may be constant during the operation-time, the discharge imposed on individual cells can vary over cell balancing-when some cells are disconnected to the load, others supply demanded power with higher current. Briskly pulling the current out of the limited number of series-connected cells incurs stress on them. One explicit effect caused by the imposed stress is a voltage drop. The lower the output voltage, the more the current is required from them. Besides, such intensive discharge has a negative impact on a battery's state of health. From this perspective, the TD policy may not be suitable for a high load demand. That is, in cell balancing, the discharge rate of individual cells is in the range of 2.9 and 4.9 C, which approximately equals 6 and 10 times higher than the initial discharge rate (i.e., 0.5 C). Although it takes as small as 1.5 seconds in most cases, it becomes critical at a low SoC level.

In the BU policy, on the other hand, such brisk discharge is limited to only the cell last connected to the load, and the time period in most cases falls to 0.4 second, which corresponds to the upper group (of the BU policy) in the figure. In the lower group, the cells (excluding the last) are discharged at smaller than 2 C for 1.7 seconds in most cases. Similarly, the MD policy forms two separate groups, but the lower group is 3 times more populated than the upper group. In the lower group, cells are discharged at 1.2 C for 1.1 seconds in most cases.

Figure 9A:
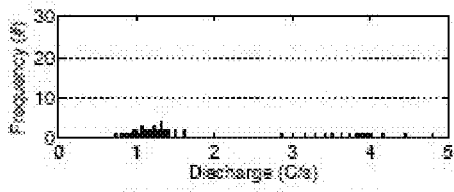
FIG. 9A-9C are graphs comparing discharge distribution for different discharge policies.
Figure 9B:
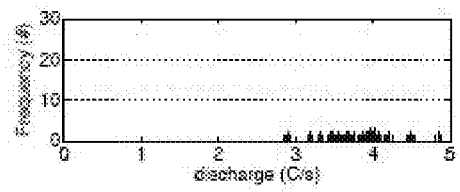
Figure 9C:
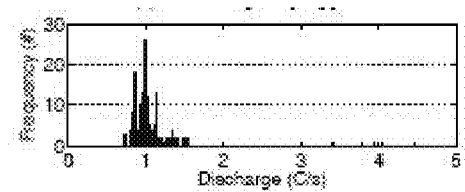

FIGS. 9A-9C show histograms of the results. Interestingly enough, the BU and TD policies are featured with a widely-spread distribution, while the MD policy is with a narrow-banded distribution that has the mean of 0.9952 (C) and the variance of 0.0350 with the outliers excluded. This distribution confirms that the MD policy is best in terms of battery health regardless of a load demand.

Unlike the BU and TD policies considering exact differences in SoCs, the MD policy takes the median of the differences to calculate the time period for cell balancing. Although this median helps mitigate the stress imposed on individual cells, it may likely give rise to immediate need for cell balancing, increasing the overhead for it accordingly. The MD policy causes 4.8 times more cell-balancing instances than either the BU or TD policy. Conversely, the BU or TD policy avails itself of a lightweight cell balancing at the cost of the stress. Consequently, an appropriate choice of combined policies, considering a tradeoff between the lightweight cell balancing and the performance overhead, should be made given a load demand and battery cell condition.

Figure 10A:
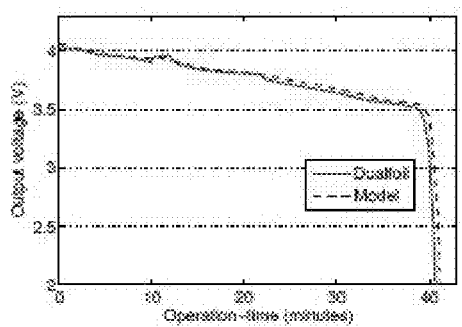
FIGS. 10A and 10B are graphs illustrating a comparison between the voltage changes with Dualfoil and a model of a disclosed embodiment.
Figure 10B:
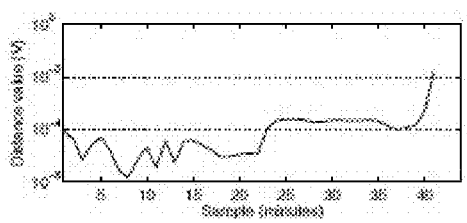

The battery-cell characteristics model is reference-based and captures the discharge and recovery efficiency. Based on the model, four scheduling mechanisms are comparatively evaluated. For this comparison to be effective, it is important to evaluate the accuracy in its simulation of battery activities. A discharge profile is synthetically specified such that the workload consists of charge at rate C for 10 minutes, rest for 2 minutes, charge at rate C for 10 minutes, and charge at rate 2 C for 20 minutes; this is sufficient to show the discharge and recovery efficiency. The discharge profile is then ported to our battery management emulator and Dualfoil, thus yielding voltage curves over the operation-time as shown in FIGS. 10A and 10B. The two voltage curves are almost identical except for the turning points at which the voltage drops steeply. To be more precise, calculate $X^2$-distance as:

$$X^2(X, Y) = \sum_{i=1}^{T} \frac{(X-Y)^2}{(X+Y)}, \qquad (21)$$

where X and Y are terminal-voltage samples from Dualfoil and the model, respectively, and T=42. Clearly, $X^2$=0 if and only if all X's samples match Y's. The lower the value of $X^2$, the more closely the two curves match. As shown in FIG. 10B, the difference between the two curves is negligibly small. Between the 10th and the 12th samples during which the recovery effect takes place, our model is shown to accurately simulate the recovery efficiency. Also, even when the discharge rate is abruptly changed at the 22nd minute, the distance value (i.e., difference), from that point, is still below 2.5E-4, and thus, the $X^2$ distance is as small as 0.0208 (V).

The adaptive filter used in our scheduling framework is based on the RLS algorithm that recursively calculates an estimate from a given history of real outputs. The size of the history in this evaluation is set to 5, i.e., p=4. Individual elements in the history are weighted separately; we train w with 50 samples, which converges to $[0.1012, 0.1916, 0.0708, 1.0377, -0.3881]^T$. In solving for the filter coefficients, the exponential forgetting factor A is set to 0.999, making it less sensitive to recent samples. Also, the gain factor g(n) is obtained by recursively solving an inverse correlation matrix, P(n) with P(0)=rl-1l, where rl=100. With these values applied, the adaptive filter is highly effective in estimating the outputs. The estimation errors are very low and the average error ratio of estimated outputs to real outputs is as low as 0.0024.

kRR and nRR are load-shared. That is, d is distributed to parallel-connected cells available in proportion to their remaining SoC level. By contrast, individual cells are discharged, one at a time, in both 1RR and 1+1RR. Thus, 1 RR and 1+1RR are likely to make individual cells overloaded and hence exhausted. FIG. 11 compares the operation-time gains of kRR, 1RR, 1+1RR, and nRR with the discharge profiles generated from equations (19) and (20). Applying kRR, the battery pack lasts up to 44% longer than 1RR, 56% longer than 1+1RR, and 7% longer than nRR. nRR outperforms 1RR and 1+1RR by 41% and 54%, respectively. 1+1RR performs as ineffectively as 1RR. Thus, kRR and nRR are suitable for heavy workloads.

By contrast, 1RR and 1+1RR make it overwhelming for individual cells to cope with heavy workloads, limiting their capability of effective scheduling. Although 1RR outperforms 1+1RR, both 1RR's and 1+1RR's battery usability appears degraded significantly as the workload becomes heavier. Also, the difference in the battery usability between 1RR and 1+1RR, and kRR and nRR grows up to 19% larger.

kRR effectively adapts itself to different workloads developed in 4 phases. For workloads lighter than 1 C×T (Phase 1 in the figure), kRR acts as 1RR which is most effective. Thus, compared to nRR, suggests that at a very low discharge rate, electrochemical dynamics inside the cell are inefficient in converting chemical energy to electrical energy although the effect is subject to individual cell characteristics. Compared to 1+1RR, 1RR is found to perform better at a low discharge rate, showing a 13% performance gain. As the workload gets heavier, however, 1RR loses its performance since the recovery efficiency lags behind the discharge rate. In Phase 2, kRR's performance is excellent, because kRR effectively determines the right number of parallel-connected cells to accommodate the increasing workload while attempting to make best of their recovery efficiency. As a result, kRR outperforms 1RR and 1=1RR by up to 11% and 21%, respectively, and achieves a reasonable gain of 1.4% against nRR. In Phase 3, kRR's scheduling performance is, on average, as good as nRR's. In other words, as few parallel-connected cells as 4 are insufficient for kRR to exploit v. As the workload becomes even heavier (Phase 4), more parallel-connected cells are required since not enough time is spend in offsetting a significant voltage drop. Obviously, such a large voltage drop can be handled by using more parallel-connected cells. Thus, kRR acts as nRR. kRR maximizes the battery usability by scheduling the charge, discharge, and rest activities while adapting itself to the varying workloads.

Figure 12:
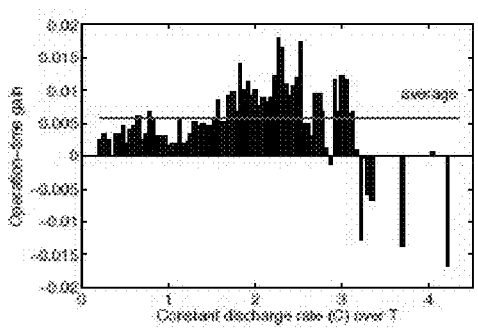
FIG. 12 is a graph illustrating the benefits of a dynamic threshold for switching a battery into $G_L$.

$\delta_G$ is a threshold according to which parallel-connected cells are partitioned into $G_H$ and $G_L$. The cells whose SoC level is below $\delta_G$ are put into $G_L$. This classification is to prevent the cells from suffering the entire terminal voltage drop of the battery pack due mainly to instantaneous high loads at their low SoC level. Moreover, $G_L$ serves as a buffer in which the charge is reserved and then delivered to accommodate light loads. The size of the buffer, however, should be adjusted to the load; the higher the load, the larger the value of 6G. The dynamic adaptation of $\delta_G$ supports the schedulability and hence extends the battery pack's operation-time. FIG. 12 shows the operation-time gains by applying the dynamic 6G. Under wide-ranging workloads (below 3.3 C×T), the dynamic $\delta_G$ proves to be effective; the maximum gain reaches 0.0179. Under heavy workloads, however, it appears difficult to adjust $\delta_G$ due mainly to unmanageable, abrupt, and steep voltage drops, implying that the high load for an individual cell is a dominating factor in the efficiency of scheduling the discharge and rest activities.

Voltage-imbalances should be avoided in discharging parallel-connected cells. When the voltage of individual cells drifts apart-which is, to some degree, unavoidable higher-voltage cells can charge lower-voltage cells, thereby causing the battery pack's terminal voltage to drop. Thus, scheduling the discharge activity must cope with voltage imbalances. kRR manages to keep the difference in voltage under 0.5%, while 1RR is subject to various loads and the cells' SoC level since a single cell should accommodate the whole load at a time. For instance, at low SoC levels of the cells, the difference in their voltage goes up to 2.5% for the 1RR scheduling. Obviously, voltage-imbalances are rarely experienced under nRR as long as all the cells of the same characteristics are discharged simultaneously at the same rate. nRR is susceptible to cell failures or anomalous voltage variations (thus unbalancing voltages). Despite the weighted discharge, nRR experiences voltage imbalances, while kRR and 1RR quickly suppress it up to 50%.

It should be understood that although the system is described largely in reference to individual battery cells, the system may be applied to sets of battery cells as well. For example, a set of battery cells connected in series may be thought of as a single battery cell capable of being discharged or charged as a single unit. Thus, a battery pack may consist of multiple sets of series chains of battery cells as well.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A battery management system, comprising:
    a plurality of battery cells arranged in reconfigurable circuit paths;
    a plurality of switches selectively interconnecting battery cells to one of charge terminals and discharge terminals; and
    a scheduling module that:
        receives an estimated load demand for the plurality of battery cells;
        determines a subset of the plurality of battery cells needed to meet the load demand, wherein the number of battery cells in the determined subset is inversely correlated to a rate at which the plurality of battery cells recover voltage in a rest state; and
        controls the plurality of switches to connect the subset of battery cells to the discharge terminals and to connect a remainder of the plurality of battery cells to the charge terminals.

2. The battery management system of claim 1 wherein the scheduling module partitions the plurality of battery cells into a group of cells eligible for discharging and another group of cells eligible for charging, wherein the scheduling module selects the subset of the plurality of battery cells needed to meet the load demand from the group of cells eligible for discharging.

3. The battery management system of claim 2 wherein the scheduling module selects battery cells having the highest state of charge in the group of cells eligible for discharging to be in the subset of the plurality of battery cells.

4. The battery management system of claim 3 wherein the scheduling module partitions the plurality of cells based on state of charge of a given battery cell in relation to a threshold, where the threshold is adjusted dynamically by the scheduling module based on the estimated load demand, an estimated maximum load demand, and a nominal capacity for the plurality of cells.

5. The battery management system of claim 1 wherein scheduling module calculates the number of battery cells in the subset by:

$$k = \frac{d^*}{v},$$

wherein d* is the estimated load demand and v is the rate at which the plurality of battery cells recover voltage in a rest state.

6. The battery management system of claim 1 further comprising an adaptive filter that receives previous load demands and estimates the load demand based on the previous load demands, wherein the previous load demands indicate an amount of power required by a plurality of applications at a specific time.

7. The battery management system of claim 1 wherein the adaptive filter performs a regression on the previous load demands to estimate the load demand.

8. The battery management system of claim 1 wherein the scheduling module coordinates charging of the battery cells in the group of cells eligible for charging while the battery cells in the group of cells eligible for discharging are being discharged.

9. The battery management system of claim 8 wherein the scheduling module selects a battery cell having the lowest state of charge in the group of cells eligible for charging, charges the selected battery cell until its state of charge reaches an average state of charge of the battery cells in the group of cells eligible for discharging, and reassigns the selected battery cell the group of cells eligible for discharging.

10. A method for scheduling battery cells for charging and discharging in a reconfigurable battery system, comprising:
monitoring state of charge for each of a plurality of battery cells;
partitioning the plurality of battery cells into a group of cells eligible for discharging and another group of cells eligible for charging in accordance with the state of charge of the battery cells;
selecting a subset of battery cells from the group of cells eligible for discharging and discharging the battery cells in the subset, where a number of battery cells in the subset of battery cells is inversely correlated to a rate at which the plurality of battery cells recover voltage in a rest state;
selecting a scheduling method based on the number of battery cells in the subset;
charging one or more battery cells in the group of cells eligible for charging while one or more battery cells in the group of cells eligible for discharging are being discharged; and
reassigning the plurality of battery cells into either the group of cells eligible for discharging or the group of cells eligible for charging after the step of charging one or more battery cells.

11. The method of claim 10 further comprises determining an estimated load demand from the plurality of battery cells using a recursive least squares method.

12. The method of claim 11 further comprises calculating the number of battery cells, k, in the subset by:

$$k = \frac{d^*}{v},$$

wherein d* is the estimated load demand and v is the rate at which the plurality of battery cells recover voltage in a rest state.

13. The method of claim 10 further comprises selecting battery cells having the highest state of charge in the group of cell eligible for discharging to be the subset.

14. The method of claim 10 wherein charging one or more battery cells further comprises selecting a battery cell having the lowest state of charge in the group of cells eligible for charging, charging the selected battery cell until its state of charge reaches an average state of charge of the battery cells in the group of cells eligible for discharging, and reassigning the selected battery cell the group of cells eligible for discharging.

15. A method for scheduling battery cells for charging and discharging in a reconfigurable battery system, comprising:
monitoring state of charge for each of a plurality of battery cells;
partitioning the plurality of battery cells into a group of cells eligible for discharging and another group of cells eligible for charging in accordance with the state of charge of the battery cells;
determining state of charge for each of the battery cells in the group of cells eligible for discharging,
determining a median state of charge for the battery cells in the group of cells eligible for discharging, and computing a period of time for discharging as a function of the median,
charging one or more battery cells in the group of cells eligible for charging while one or more battery cells in the group of cells eligible for discharging are being discharged;
discharging battery cells in the group of cells eligible for discharging for the computed period of time while bypassing a given battery cell in the group of cells eligible for discharging having the lowest state of charge in the group of cells eligible for discharging; and
reassigning the plurality of battery cells into either the group of cells eligible for discharging or the group of cells eligible for charging after the step of charging one or more battery cells.

16. A method for scheduling battery cells for charging and discharging in a reconfigurable battery system, comprising:
monitoring state of charge for each of a plurality of battery cells;
partitioning the plurality of battery cells into a group of cells eligible for discharging and another group of cells eligible for charging in accordance with the state of charge of the battery cells;
determining state of charge for each of the battery cells in the group of cells eligible for discharging,
determining a median state of charge for the battery cells in the group of cells eligible for discharging,
charging one or more battery cells in the group of cells eligible for charging while one or more battery cells in the group of cells eligible for discharging are being discharged;
discharging battery cells in the group of cells eligible for discharging by an amount equal to the median while bypassing a given battery cell in the group of cells eligible for discharging having the lowest state of charge in the group of cells eligible for discharging; and
reassigning the plurality of battery cells into either the group of cells eligible for discharging or the group of cells eligible for charging after the step of charging one or more battery cells.

* * * * *